United States Patent [19]

Akiyama

[11] Patent Number: 5,712,835
[45] Date of Patent: Jan. 27, 1998

[54] TRACK JUMP DEVICE AND INFORMATION RECORDING MEDIUM DRIVING APPARATUS

[75] Inventor: Jun Akiyama, Kashihara, Japan

[73] Assignee: Sharp Kabushiki Kaisha, Osaka, Japan

[21] Appl. No.: 834,230

[22] Filed: Apr. 15, 1997

Related U.S. Application Data

[63] Continuation of Ser. No. 615,880, Mar. 14, 1996, abandoned.

[30] Foreign Application Priority Data

Apr. 4, 1995 [JP] Japan .................................. 7-079203

[51] Int. Cl.[6] ........................................................ G11B 7/00
[52] U.S. Cl. ........................................................ 369/32
[58] Field of Search .................................. 369/44.27, 44.28, 369/44.29, 32

[56] References Cited

U.S. PATENT DOCUMENTS

| | | | |
|---|---|---|---|
| 4,716,557 | 12/1987 | Otani | 369/32 |
| 4,939,712 | 7/1990 | Abe et al. | 369/32 |
| 5,090,002 | 2/1992 | Chow et al. | 369/32 |
| 5,184,338 | 2/1993 | Shimoda et al. | 369/32 |

FOREIGN PATENT DOCUMENTS

| | | |
|---|---|---|
| 0307130 A2 | 3/1989 | European Pat. Off. . |
| 0399225 A1 | 11/1990 | European Pat. Off. . |
| 0626679 A2 | 11/1994 | European Pat. Off. . |
| 0628952 A2 | 12/1994 | European Pat. Off. . |
| 63-57859 | 11/1988 | Japan . |
| 6-282857 | 10/1994 | Japan . |
| 2056118 | 3/1981 | United Kingdom . |

*Primary Examiner*—Nabil Hindi
*Attorney, Agent, or Firm*—Nixon & Vanderhye P.C.

[57] ABSTRACT

An optical disk driving apparatus projects an optical beam onto a certain track on an optical disk and forms a light spot thereon. In an access operation onto an adjacent track, the light spot makes a 3-track jump from the position P1 onto the position P2, then a 2-track jump in the opposite direction onto the position P3. With such an arrangement, since the light spot moves by at least 2 tracks even in an access operation onto an adjacent track, it is possible to detect a zero crossing in a tracking error signal. Therefore, it is enabled to steadily adjust the speed of the movement of an objective lens based on the zero crossing. In consequence, a stable access to an information recording medium can be realized with an inexpensive arrangement.

8 Claims, 5 Drawing Sheets

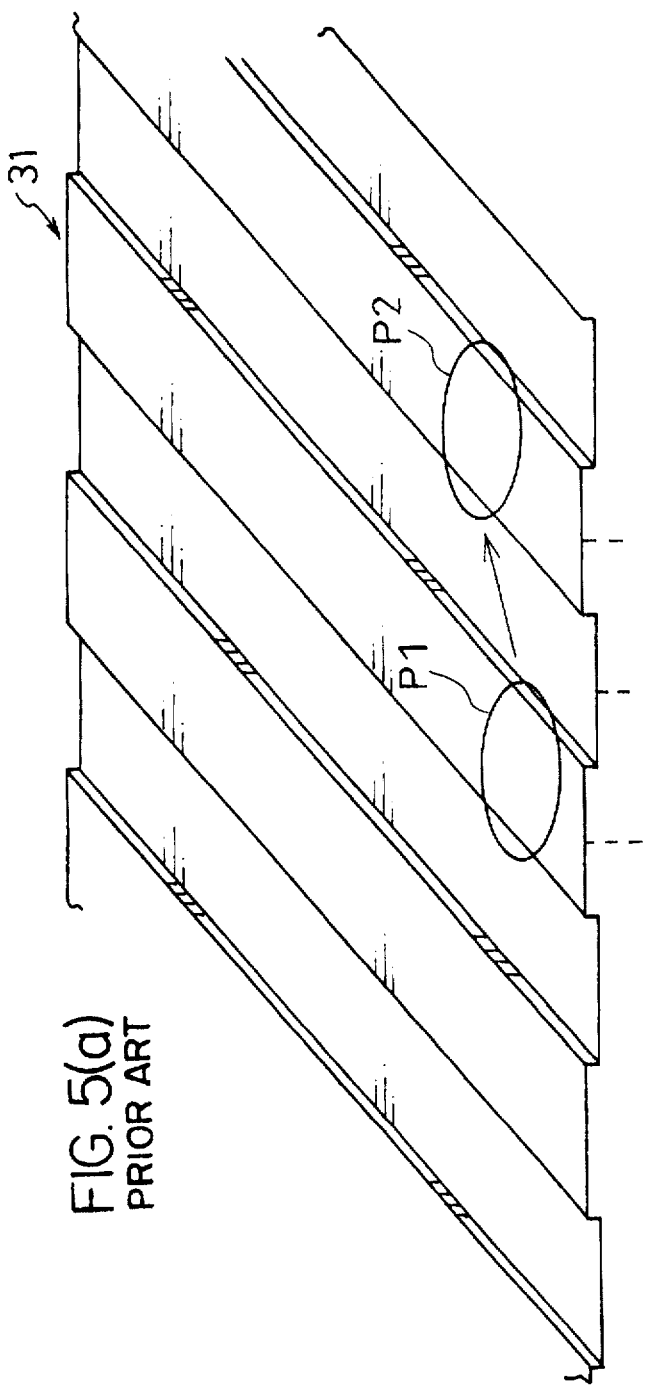

TRACK JUMP DEVICE AND INFORMATION RECORDING MEDIUM DRIVING APPARATUS

This is a continuation of application Ser. No. 08/615,880, filed Mar. 14, 1996, now abandoned.

FIELD OF THE INVENTION

The present invention relates to a track jump device of an information recording medium driving apparatus for recording and reproducing information on and from an information recording medium such as an optical disk, and it relates especially to an information recording medium driving apparatus which is able to access to an information recording medium wherein adjacent tracks have different tracking polarities.

BACKGROUND OF THE INVENTION

Recently the amount of information has been drastically increasing, as information in various forms, such as picture information and audio information, has been digitized. In parallel with the trend, it has been strongly demanded that an information recording medium has a larger capacity and higher density. In the case of an optical information recording medium, for instance, densification has been attempted by enhancing track recording density and narrowing track pitch. But, the track pitch cannot be narrowed to such an extent that appropriate tracking control signals may not obtained in reproducing information. Therefore, there is a limit on narrowing the track pitch.

As a well-known attempt for densification of an information recording medium, Japanese Examined Patent Publication No. 63-57859/1988 proposes a device which records and reproduces information on and from both a land and a groove which are formed on the surface of an information recording medium and are regarded as tracks.

In such an information recording medium wherein information is recorded in both the groove and the land, the groove and the land are always adjacent and never cross each other, no matter how they are provided, i.e., in a concentric manner or a spiral manner. Therefore, in the conventional arrangement shown in the above publication, access control is carried out by use of a track jump so that the position of a light spot is changed from a groove to a land or vice versa.

The following description explains the track jumping of the conventional device in reference to FIGS. 4 and 5. FIG. 4 is a block diagram illustrating a schematic structure of a portion relating to the track jump in the conventional device. As the figure shows, the conventional device includes an optical pickup 34 for projecting a laser beam onto an optical disk 31 which is rotating, and an objective lens 33 for converging the projected laser beam onto the surface of the optical disk 31.

The objective lens 33 is provided movably over the surface of the optical disk 31, and performs access operations such as control of tracking and control of a track jump in accordance with the control of a tracking control unit 36 and a jump control unit 38, as will be described below.

The optical pickup 34 is provided with a photodetector (not shown) which outputs an electric signal varying in accordance with reflected light from the surface of the optical disk 31. In response to the electric signal, a differential amplifier 35 outputs a tracking error signal (hereinafter referred to as TES). In accordance with the move of the light spot, TES changes in a sinusoidal manner, as shown in FIG. 5(b).

The TES outputted from the differential amplifier 35 is sent to the tracking control unit 36. Based on the TES thus inputted, the tracking control unit 36 inverts a tracking polarity depending on whether the groove or the land is tracked. The tracking control unit 36 performs a proper phase compensation and outputs a tracking control signal so that the objective lens 33 carries out the tracking control.

The jump control unit 38 controls the switching operation of a switch 39, while issuing a driving pulse which accelerates the objective lens 33 in the track jump, in response to TES and commands supplied by an external device (not shown).

The switching is carried out by the switch 39 between a driving unit 37 and the tracking control unit 36 or the jump control unit 38. When the driving unit 37 is connected with a position a, a tracking signal from the tracking control unit 36 is sent as a driving signal (hereinafter referred to as DRV) to the driving unit 37. When the driving unit 37 is connected with a position b, a driving pulse for the track jump from the jump control unit 38 is sent as DRV to the driving unit 37. Note that the switching operation of the switch 39 is controlled by the jump control unit 38.

The following explanation describes how a track jump is made from one land track to another land track. FIGS. 5(a) to 5(c) illustrate a movement of a light spot and waveforms of TES and DRV during such a track jump.

First of all, the driving unit 37 is connected with the tracking control unit 36 through the position a before a track jump, and the tracking is conducted in response to the tracking signal outputted from the tracking control unit 36. On receiving a track jump command, the jump control unit 38 controls the switch 39 so that the driving unit 37 is connected with the jump control unit 38 through the position b, thereby stopping the tracking operation, and outputs a driving pulse for accelerating the objective lens 33. Therefore, the objective lens 33 is driven, so that the light spot starts moving from a position P1 to a position P2.

In accordance with the move of the light spot, TES changes in a sinusoidal manner. When the light spot reaches the center of a groove track, TES becomes 0 volt, and a zero crossing is detected. On detecting the zero crossing, the jump control unit 38 inverts the polarity of the driving pulse so that the objective lens 33 is decelerated. After a certain period of time is elapsed since the polarity of the driving pulse was inverted, the jump control unit 38 controls the switch 39 so that the driving unit 37 is connected with the jump control unit 38 through the position b and simultaneously stops outputting the driving pulse. As a result, the light spot has made a 2-track jump to the target land track. The tracking operation is resumed with respect to the target track where the light spot arrived in accordance with a tracking control signal outputted from the tracking control unit 36.

The track jump is carried out from one land track to another land track in such a manner as has been described above. Other than the above method wherein the polarity of a driving pulse is inverted when the zero crossing is detected, there is another arrangement wherein a driving pulse for acceleration is outputted for a predetermined period of time since a track jump starts. But, such an arrangement has the following problem. Namely, the correct track jump is not carried out to the target track, due to allowance of track pitch, uneven acceleration of the objective lens as of the commencement of a track jump, and uneven sensitivity of an objective lens driving actuator, and other affections, thereby causing that the tracking access is unstably carried out after such a track jump. Therefore, the former arrangement using a zero crossing of TES is usually adopted.

Secondly, the following explanation describes how a track jump is made from one land track to an adjacent groove track. The distance of a move of the objective lens 33 is half in this case, in comparison with the above-mentioned track jumping from one land track to another land track. The above-mentioned arrangement using a zero crossing of TES is not suitable to make such a jump. As is clear from the waveform of TES in FIG. 5(b), no zero crossing of TES appears when the objective lens 33 moves from the center of a land track to the center of the adjacent groove track. Accordingly, the arrangement using a zero crossing of TES has a problem that the timing of inverting the polarity of the driving pulse cannot be obtained.

An arrangement to solve such a problem is proposed in Japanese Publication for Unexamined Patent Application No. 6-282857/1994. According to the arrangement in the publication, as shown in FIG. 4, a jump control unit 38 for controlling a track jump is provided with a peak detection circuit 32 for detecting the upper and lower peaks of the TES waveform, so that the peak detection circuit 32 inverts a driving pulse when each peak is detected. Since each peak of TES comes at the midpoint between one zero crossing and the following one, inverting the polarity of the driving pulse at a peak enables a one-track jump, that is, a jump onto the adjacent track. In addition, the polarity of a groove track is reverse to that of a land track. By inverting the polarity of tracking by the tracking control unit 36, it is enabled to obtain appropriate tracking operation at a groove track after a track jump from a land track to a groove track.

In the above-mentioned arrangement, a differential circuit is generally used as a peak detection circuit. However, the differential circuit has the following problems. As a differential circuit is a comparatively expensive item, it causes a hike in manufacturing cost. In addition, the differential circuit has a characteristic of a high-pass filter, and amplifies noise of high frequency components in TES, which affects the detection of a peak, i.e., there is possibility that the detected peak deviates from the position of the correct peak. In case the detection is inaccurate due to the affection of the amplified noise, incorrect information on a peak causes a track jump to be unsteady.

SUMMARY OF THE INVENTION

The object of the present invention is (1) to provide an information recording medium driving apparatus, which is capable of executing a stable track jump to an adjacent track during recording and reproduction of information on and from an information recording medium wherein the track polarities of adjacent tracks differ from each other, and (2) to provide such an apparatus in a structure which allows it to be produced at a lower cost.

To achieve the above object, the information recording medium driving apparatus in accordance with the present invention conducts at least either of recording or reproduction of information on or from an information recording medium wherein adjacent tracks have different tracking polarities respectively, such as a land track and a groove track. The apparatus is composed of (1) optical means, provided movably over the information recording medium, for irradiating with light a surface of the information recording medium, so as to form a light spot thereon, (2) speed adjusting means for detecting a zero crossing in a tracking error signal, and for adjusting a speed of a movement of the optical means in response to the detected zero crossing so that the optical means reaches a target track, and (3) track jump control means for controlling the optical means, during moving the light spot from one track to an adjacent one, so as to carry out first and second track jumps in this order. Note that the first and second track jumps are either an N-track jump wherein (N≧2) in an opposite direction of the target adjacent track an (N+1)-track jump in a direction toward the target adjacent track.

With the arrangement, the track jump control means controls the optical means so that the light spot, for example, makes an N-track jump wherein (N≧2) in one direction then an (N+1)-track jump in the opposite direction, whereby the light spot moves from one track to the adjacent track. In such a movement, since the light spot moves by at least two tracks, the tracking error signal has at least one zero crossing. Therefore, the speed adjusting means can adjust the speed of the movement of the optical means in accordance with a detection of a zero crossing and enables the optical means to get to the target track.

In contrast, in the prior art case where the optical means directly moves from one track to an adjacent track, i.e., makes a one-track jump, the tracking error signal doesn't have a zero crossing. Therefore, the control by utilizing zero crossing is impossible. In such a case, a differentiating circuit, for example, is required in order to detect a peak instead of a zero crossing of the tracking error signal.

In accordance with the present invention, it is possible to make a one-track jump without such a differentiating circuit, thereby to simplify the structure of an information recording medium driving apparatus and to reduce the cost of production. In addition, whereas a peak of the tracking error signal detected by a differentiating circuit likely has an error due to noise which is derived from the characteristic of such a differentiating circuit, the detection of a zero crossing is carried out in a stable manner without error according to the present invention. Therefore, it is possible in the present invention to steadily adjust the speed of movement of the optical means. Consequently, it is enabled to obtain an information recording medium driving apparatus which can be produced at a lower cost and which performs stable access to an information recording medium.

Moreover, the present invention proposes another arrangement of an information recording medium driving apparatus, whereby track jump control means controls optical means, during the movement of the light spot from one track to an adjacent one, so as to carry out a first track jump, a tracking operation, and a second track jump in this order. Note that the first and second track jumps are either an N-track jump with (N≧2) in an opposite direction from the target adjacent track or an (N+1)-track jump in a direction of the target track.

With the above-mentioned arrangement, because the optical means is made to conduct a tracking operation after the light spot made the first track jump and arrived at a certain track, the position of the light spot is corrected to the appropriate position on the track. Then, the light spot reaches the target track when track jump control means controls the optical means so that the second track jump is conducted. In short, the second track jump is made from the corrected, appropriate position. Thus, the accuracy in positioning the light spot when it arrives at the target track is improved. Consequently, it is enabled to obtain an information recording medium driving apparatus which can be produced at a lower cost and which performs steady access to an information recording medium.

For a fuller understanding of the nature and advantages of the invention, reference should be made to the ensuing detailed description taken in conjunction with the accompanying drawings.

BRIEF DESCRIPTION OF THE DRAWINGS

FIGS. 5(a) to 5(c) are views explaining the relationship between movement of a light spot, a tracking error signal (TES), and an objective lens driving signal (DRV) during a 2-track jump of the conventional information recording medium driving apparatus.

DESCRIPTION OF THE PREFERRED EMBODIMENTS

Figure 1:
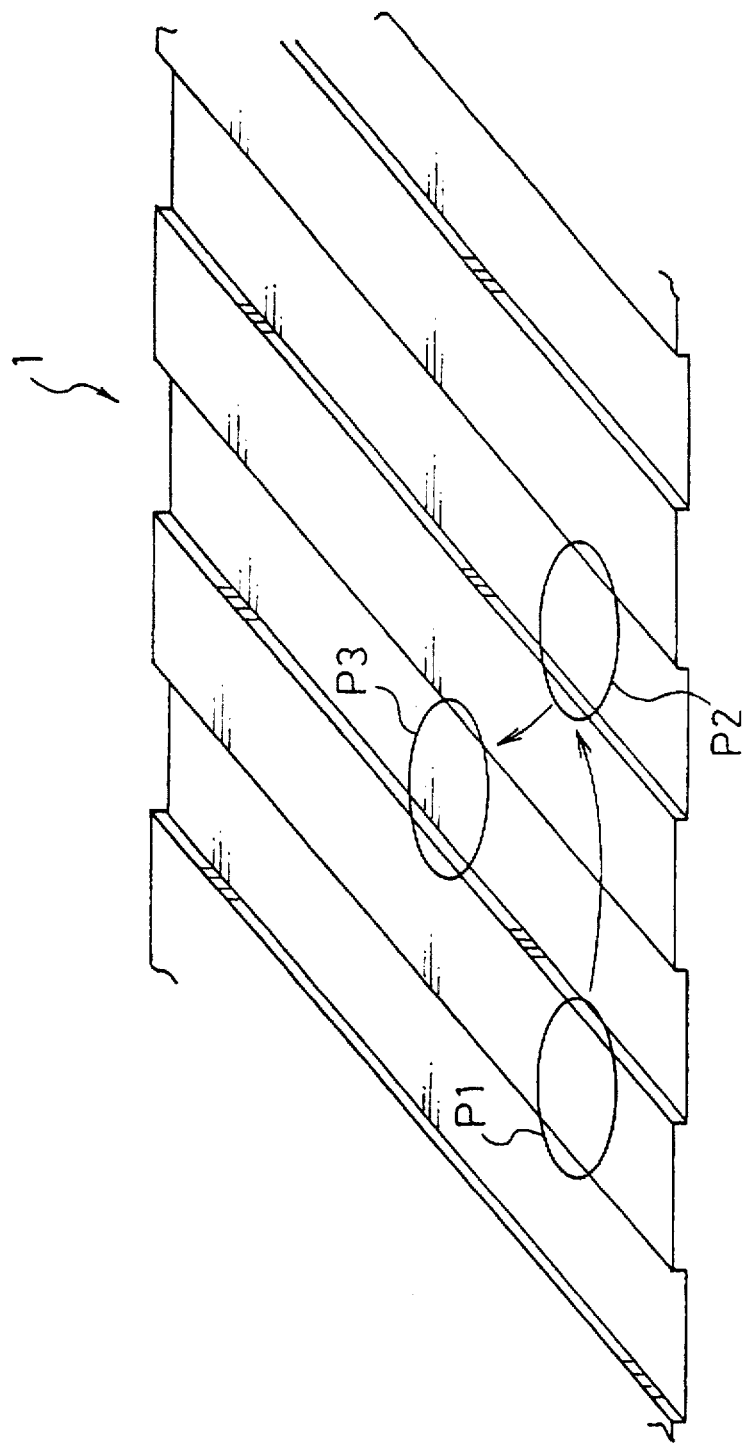
FIG. 1 is a view explaining a movement of a light spot on an optical disk during a track jump of an optical disk driving device in one embodiment of the present invention.
Figure 2:
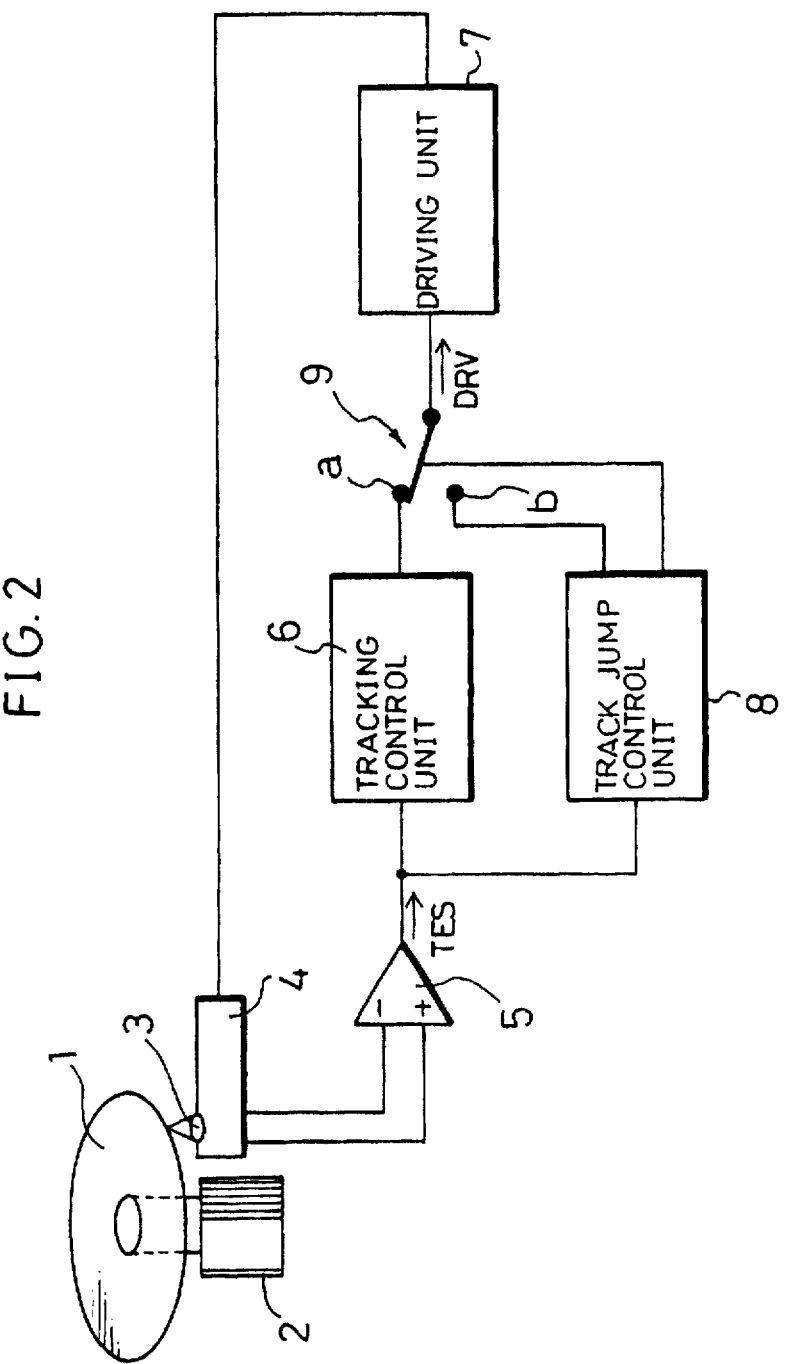
FIG. 2 is a block diagram showing a schematic structure whereby the optical disk driving device performs a track jump.
Figure 3:
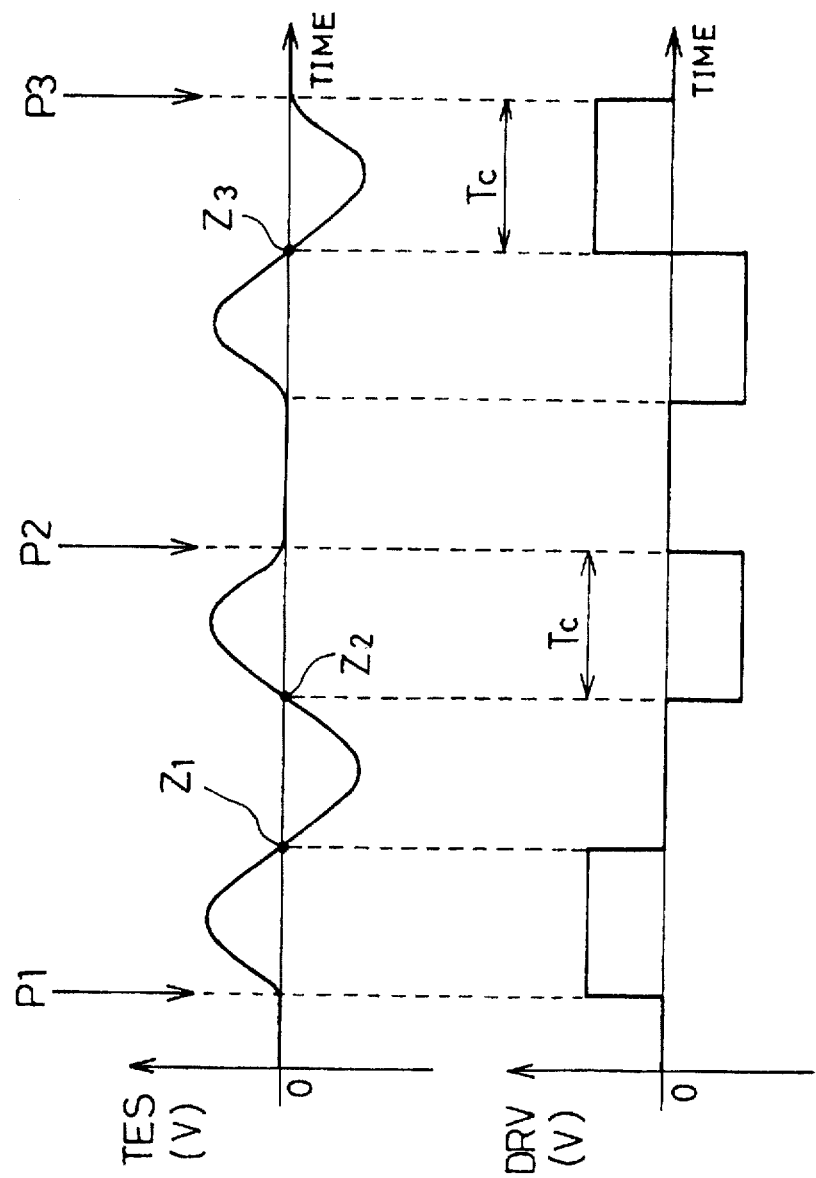
FIG. 3 is waveforms illustrating the relationship between a tracking error signal (TES) which is detected in the optical disk driving device, and an objective lens driving signal (DRV).
Figure 4:
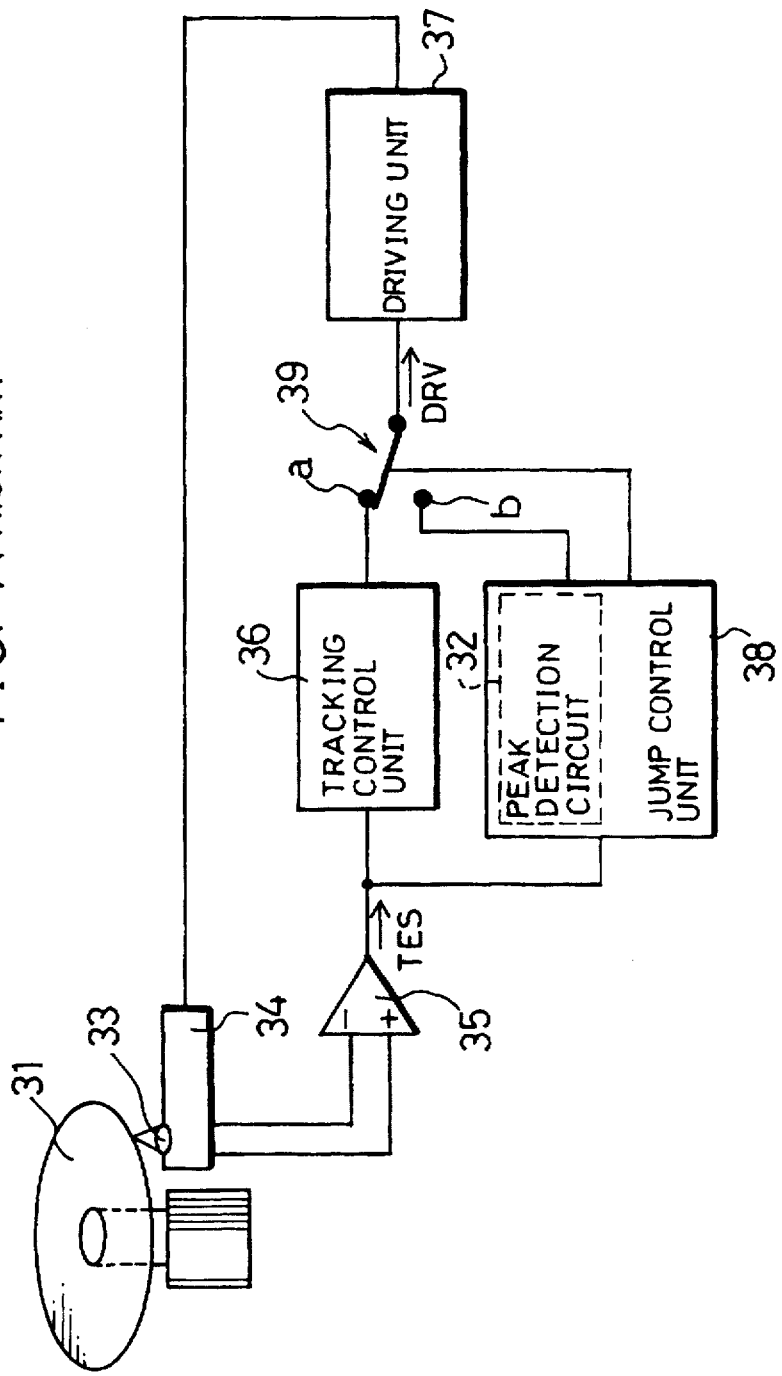
FIG. 4 is a block diagram showing a schematic structure of a conventional information recording medium driving apparatus.

The following explanation describes one embodiment of the present invention with reference to FIGS. 1 through 3.

FIG. 1 is a view showing a track jump performed by an optical disk driving device as an information recording medium driving apparatus in the present embodiment. As shown in the figure, the optical disk driving device of the present embodiment makes a 3-track jump as the first track jump, then a 2-track jump as the second track jump in the opposite direction of the first track jump. Thus, access to an adjacent track is performed.

To be more specific, a light spot which is at the position P1 on a land track moves onto the position P2 on a groove track in accordance with the first track jump, then moves onto the position P3 on a groove track in accordance with the second track jump. As a result, the light spot has moved, from the land track where the light spot first stayed, onto the adjacent groove track.

Referring to FIG. 2, the following description depicts the structure for making the above track jump.

The present optical disk driving device is composed of: a driving motor 2 for rotating an optical disk 1; an optical pickup 4 for projecting a laser beam onto the optical disk 1 and for receiving reflected light from the optical disk 1; and an objective lens 3 (optical means) for converging the projected laser beam onto the surface of the optical disk 1.

The objective lens 3 is provided movably over the surface of the optical disk 1, and performs (1) focusing control for keeping the focus of the laser beam on the recording surface of the optical disk 1, (2) tracking control for keeping the laser beam at the center of a track, and (3) track jump control for moving the laser beam to a target track by a track jump.

The optical pickup 4 is provided with a photodetector (not shown) which outputs an electric signal varying in accordance with the reflected light from the surface of the optical disk 1. The optical pickup 4 is also provided with a differential amplifier 5 which outputs a tracking error signal (hereinafter referred to as TES) based on the electric signal, a tracking control unit 6 which controls a tracking operation, a track jump control unit 8 (speed adjusting means, track jump control means) which controls a track jump operation, a driving unit 7 which outputs a driving pulse for driving the objective lens 3, and a switch 9 which switches between the output of the tracking control unit 6 and the track jump control unit 8 so that the switched output is sent to the the driving unit 7.

The tracking operation controlled by the tracking control unit 6 is an action by which a spot of the laser beam follows a track of the rotating optical disk 1. The tracking control unit 6 inverts a tracking polarity depending on whether the groove or the land is tracked. The tracking control unit performs a proper phase compensation and outputs a tracking control signal, and then, the position of a spot of light converged by the objective lens 3 so that the light spot performs an appropriate scanning along the center of each track.

On the other hand, in response to the TES which is supplied by the differential amplifier 5 and to a command supplied by an external device (not shown), the track jump control unit 8 controls the switching operation conducted by the switch 9 and outputs a driving pulse which causes the objective lens 3 to carry out the track jump.

When the switch 9 connects the tracking control unit 6 with the driving unit 7 through a position a, a tracking control signal from the tracking control unit 6 is sent to the driving unit 7 as a driving signal (hereinafter referred to as DRV). On the other hand, when the switch 9 connects the track jump control unit 8 with the driving unit 7 through a position b, a driving pulse for a track jump from the track jump control unit 8 is sent to the driving unit 7 as DRV. The DRV thus selectively supplied by the switch 9 is power-amplified by the driving unit 7 so as to drive the objective lens 3.

The following explanation specifically describes the track jump onto an adjacent track under the above arrangement.

Before a track jump, the driving unit 7 is connected with the tracking control unit 6 through the position a of the switch 9, and the objective lens 3 performs the tracking operation in response to the tracking control signal outputted from the tracking control unit 6. Here, it is assumed that the light spot is at the position P1 in FIG. 1 when a track jump command is issued.

On receiving the track jump command, the track jump control unit 8 controls the switch 9 so that the driving unit 7 is connected with the track jump control unit 8 through the position b to stop the tracking operation, while issuing the driving pulse to accelerate the objective lens 3. The driving pulse is sent as DRV to the driving unit 7 via the switch 9. Thereby the objective lens 3 is driven and accelerated, while the light spot starts moving from the position P1 to the position P2, as shown in FIG. 1.

TES changes in a sinusoidal manner in accordance with the move of the light spot, as shown in FIG. 3. When the light spot arrives at the center of a groove track which adjoins the track of the position P1, TES becomes 0 V. Thus, a zero crossing ($Z_1$) is detected. The track jump control unit 8, on detecting the zero crossing, reduces DRV to 0 V (see FIG. 3). Since DRV is 0 V, the objective lens 3 is neither accelerated nor decelerated, and goes toward the position P2 by the force of inertia.

When the light spot arrives at the center of the second land track from the position P1, another zero crossing ($Z_2$) in TES is detected. When the second zero crossing ($Z_2$) is detected, the track jump control unit 8 outputs DRV to decelerate the objective lens 3. The lens 3 is decelerated in response to the DRV.

Incidentally, as clearly illustrated in FIG. 3, the DRY which decelerates the objective lens 3 is a pulse reverse to that of the DRV which accelerates the objective lens 3. In addition, the pulse widths of the two kinds of DRV are equal, because DRV is made 0 V for a period corresponding to a half of the TES cycle, after DRV accelerates the objective lens 3 and before DRY decelerates it. Thereby the settling of the tracking operation after a track jump requires less time during the tracking control.

After a predetermined period of time (Tc) has elapsed since DRV is outputted for decelerating the objective lens 3, the track jump control unit 8 controls the switch 9 so that the driving unit 7 is connected with the tracking control unit 6 through the position a and simultaneously stops outputting DRV. Thereby the light spot is positioned at the position P2, and at the same time a tracking control signal from the tracking control unit 6 is sent to the driving unit 7 as DRV. Thus, the tracking operation is resumed on the track on which the position P2 lies. Note that the position of the light spot is corrected to the appropriate place on the track by once resuming a tracking operation.

The polarities of the tracks before and after the track jump are different because the light spot has moved from the land track to the groove track. Accordingly, the tracking polarity is inverted by the tracking control unit 6 during the period between the start of the track jump and the resumption of the tracking operation after the track jump. As to the timing when the tracking control unit 6 inverts the tracking polarities, any timing will do provided that the tracking control signal is not sent from the tracking control unit 6 to the driving unit 7 by controlling the switch 9 so that the driving unit 7 is connected with the track jump control unit 8 through the position b.

The first track jump from the position P1 to the position P2 is carried out in accordance with the above control procedure. Consecutively conducted is the second track jump from the position P2 to the position P3, in the direction opposite to that of the first track jump. The second track jump is a 2-track jump, which is executed under the control in the following procedure.

First of all, as soon as the switch 9 is controlled so that the driving unit 7 is connected with the track jump control unit 8 through the position b, the track jump control unit 8 outputs DRV for accelerating the objective lens 3. Note that the DRV here outputted for accelerating the objective lens 3 has the same polarity as that of the DRV outputted in the first track jump for decelerating the objective lens 3, because the direction of the acceleration this time is opposite to the direction of the first track jump from the position P1 to the position P2.

The objective lens 3 is driven and accelerated to move from the position P2 to the position P3 in response to DRV for accelerating the objective lens 3, and in accordance with the move of the objective lens 3, TES changes in a sinusoidal manner. The track jump control unit 8 inverts the polarity of DRV when detecting the first zero crossing ($Z_3$) in TES. Then, the track jump control unit 8 stops outputting DRV and controls the switch 9 so that the driving unit 7 is connected with the tracking control unit 6 through the position a when a predetermined period of time (Tc) has passed. Thereby the light spot is positioned at the position P3 and at the same time the tracking operation is resumed on the track where the position P3 lies. Thus, the second track jump from the position P2 to the position P3 is completed.

In the above case, DRV is inverted when the first zero crossing ($Z_3$) is detected, since the second track jump is a 2-track jump. In case the second track jump is, for example, a 4-track jump, the following procedure may be taken; when the first zero crossing ($Z_3$) is detected, DRY is made 0 V once, and when the third zero crossing is detected, that is, when one cycle of TES has passed, DRV is inverted.

Thus, as mentioned above, the pulse widths of the two kinds of DRV respectively for accelerating and decelerating the objective lens 3 are equal, and it is possible to shorten the time required for settling the tracking operation during the tracking control after a track jump. Note that a period of time for keeping DRV to 0 V can be set to any needed length, provided that the pulse widths of the two types of DRV respectively for accelerating and for decelerating the objective lens 3 are equal. For example, in case of an even-number-track jump, instead of such a period, DRV may be inverted at a zero crossing which is detected at the midpoint between the start and the end of a track jump.

As has been so far described, during a move of the light spot from the position P1 to the position P3, conducted are the first track jump from the position P1 to the position P2 and the second track jump from the position P2 to the position P3, and thus access to an adjacent track is performed.

The above description depicted as an example a track jump wherein after a 3-track jump (N+1) as the first track jump a 2-track jump (N=2) as the second track jump is carried out. But, the reverse way will do, whereby a 2-track jump (N=2) in a direction away from the target track is conducted as the first track jump, and then a 3-track jump (N+1) in the opposite direction is conducted as the second track jump.

The number of tracks to be jumped over is not limited to the above-mentioned combination of a 2-track jump and a 3-track jump. It is possible to access an adjacent track by, for example, making a 10-track jump as the first track jump and a 9-track jump as the second track jump.

However, the more tracks that are jumped, the more time it takes in jumping, causing the access time to increase. Therefore, the less tracks that are jumped over, the better it is. In addition, as the number of tracks which are jumped over increases, mistakes in track counting stemming from defects of a disk and other causes are more likely to happen, thereby more unlikely inducing errors in an access operation. A jump over less tracks is preferable from a viewpoint of avoiding such an error in an access operation.

However, the number of tracks over which the light spot moves during one jump needs to be not less than 2 in order to get a timing to invert DRV according to a zero crossing, as mentioned above. Therefore, in the case of the combination of a 3-track jump and a 2-track jump, it is possible to achieve the least total number of tracks to be jumped over.

Accordingly, making a 3-track jump as the first jump and a 2-track jump as the second jump, or making the two jumps in reverse order, has effects such as enabling the optimal and the most stable access, thereby restraining an increase in the access time and avoiding errors in an access operation.

In the present embodiment, described is an arrangement wherein the track jumping is controlled so that after the first track jump the tracking operation is conducted until the second track jump starts. But, the second track jump may start consecutively after the first track jump without a tracking operation.

Such an arrangement has an advantage of reducing the access time by the time spent for the tracking operation, in comparison with the arrangement wherein the tracking operation is inserted between two jumps, though the position of the light spot at the start of the second track jump may possibly be a little out of the right place. On the other hand, a stable tracking operation after the second track jump is enabled under the arrangement of the present embodiment, since the tracking operation is resumed after the first track jump, thereby appropriately positioning the light spot to the correct position in the center of the track before the start of the second track jump, although the access time is a little longer than that in the above arrangement. Accordingly, whether or not a tracking operation is inserted between the first and second track jumps is determined, depending on whether the improvement of accuracy in the access operation or the reduction of the access time is important.

In accordance with the arrangement of the present embodiment, as has been described so far, the track jumping is controlled so that the light spot on a certain track moves onto an adjacent track in the following manner; an N-track jump (N≧2) and an (N−1)-track jump are carried out in this order as the first and the second jumps respectively, or an N-track jump (N≧2) and an (N+1)-track jump are carried out in this order as the first and the second jumps respectively.

Thus, since the light spot moves by not less than 2 tracks during the access even onto an adjacent track, it is enabled to detect a zero crossing of TES. Accordingly, it is possible to control acceleration and deceleration of the objective lens 3 based on the detected zero crossing. In consequence, it is possible to perform a stable track jump with an inexpensive and simplified arrangement which doesn't need a differential circuit for detecting a peak of TES.

Further, with the arrangement wherein a differential circuit is employed to detect a peak of TES, it is most likely possible that the detection of a peak by the differential circuit is inaccurate due to noise which is derived from the characteristic of a differential circuit. In contrast, under the arrangement of the present embodiment, it is enabled to steadily control a speed of a movement of the objective lens 3, since a zero crossing can be detected in a comparatively stable manner.

Note that the present invention should not be restricted to the present embodiment, and may be varied in many ways within the scope of the invention. For example, although the arrangement adopted to the present embodiment includes only an objective lens as optical means, it is possible to employ an optical means a structure which includes an objective lens and other members. Further, the track jump control unit 8 has both the functions as speed adjusting means and track jump control means in the arrangement of the present embodiment, whereas it is possible to substitute different circuits and other items for respective means.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A track jump device of an information recording medium driving apparatus, for the use with an information recording medium wherein adjacent tracks have first and second polarities different from each other respectively, said apparatus for conducting at least either recording or reproduction of information with respect to the information recording medium, said track jump device comprising:

optical means, provided movably over the information recording medium, for irradiating with light a surface of the information recording medium so as to form a light spot thereon;

track jump control means for controlling said optical means so that the light spot carries out a pair of a target-direction track jump and an opposite-direction track jump during a movement of the light spot from a track A having the first polarity to a track B which is adjacent to the track A and has the second polarity, the target-direction track jump being an (N+1)-track jump (N≧2) in a target direction from the track A to the target track B, the opposite-direction track jump being an N-track jump in a direction opposite to the target direction; and polarity switching means for switching a tracking polarity during an odd-number-track jump in the target or opposite direction.

2. The track jump device as set forth in claim 1, wherein said track jump control means controls said optical means so that the light spot carries out the target-direction track jump, and thereafter carries out the opposite-direction track jump.

3. The track jump device as set forth in claim 1, wherein said track jump control means controls said optical means so that the light spot carries out the opposite-direction track jump, and thereafter carries out the target-direction track jump.

4. The track jump device as set forth in claim 1, wherein said N is 2.

5. A track jump device as set forth in claim 1, further comprising a driving signal outputting means for outputting a driving signal to said optical means, said driving signal outputting means outputting, as the driving signal:

a first polar pulse when accelerating said optical means; and a second polar pulse when decelerating said optical means, the second polar pulse having a polarity reverse to that of the first polar pulse and having a pulse width equal to that of the first polar pulse, wherein in a case where the odd-number-track jump in the target direction or in the opposite direction is carried out, said driving signal outputting means outputs the driving signal so that a period, during which said optical means moves due to its moment of inertia, is provided between a period during which said optical means is accelerated due to the first polar pulse and a period during which said optical means is decelerated due to the second polar pulse.

6. A track jump device as set forth in claim 5, further comprising:

detecting means for detecting a crossing point when the light spot crosses a track, the crossing point indicating a center of the track; and timing setting means for setting a timing for outputting the first polar pulse, a timing for outputting the second polar pulse, and a period during Which the output of the first and second polar pulses is suspended, in accordance with results of the detection by said detecting means.

7. A track jump device as set forth in claim 1, further comprising tracking control means for carrying out a tracking operation after either the target-direction track jump or the opposite-direction track jump is carried out and before the other track jump is carried out.

8. The track jump device as set forth in claim 1, wherein the information recording medium has tracks both on lands and on grooves.

* * * * *